O. E. HAUSBURG.
WATCHMAN'S CLOCK INSTALLMENT.
APPLICATION FILED APR. 1, 1905. RENEWED SEPT. 18, 1908.
912,957.
Patented Feb. 16, 1909.
2 SHEETS—SHEET 1.
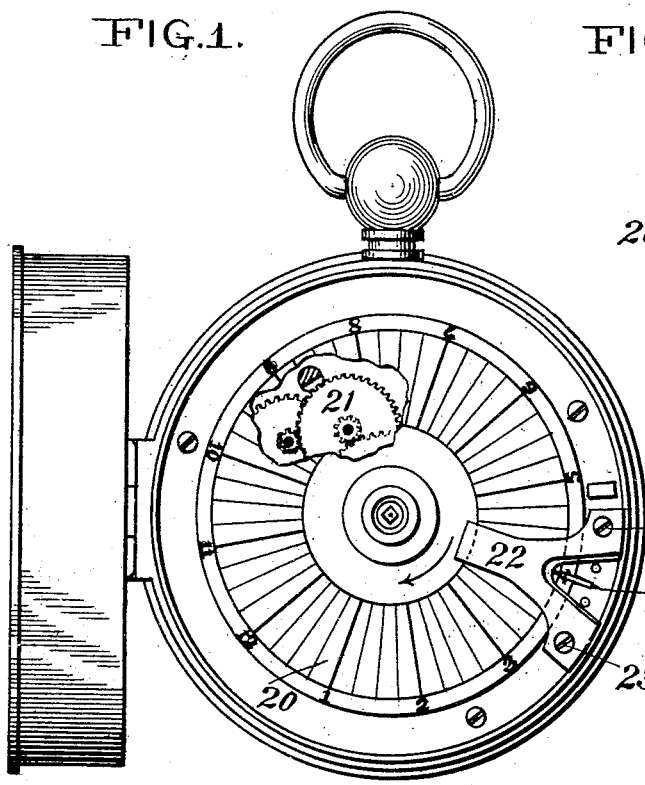
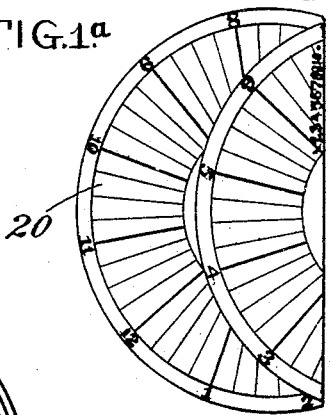
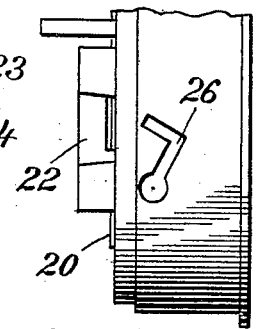
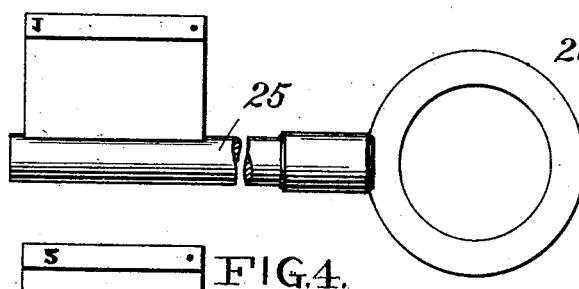
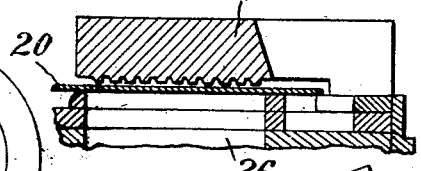
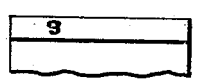
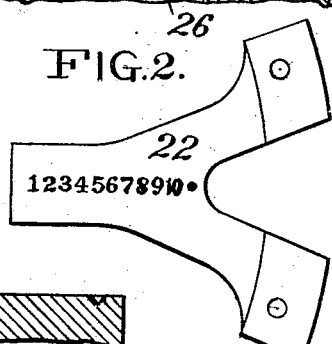
Witnesses
Inventor
Otto E. Hausburg
By his Attorney
Edward P. Thompson O. E. HAUSBURG.
WATCHMAN'S CLOCK INSTALLMENT.
APPLICATION FILED APR. 1, 1905. RENEWED SEPT. 18, 1908.
No. 912,957.
Patented Feb. 16, 1909.
2 SHEETS—SHEET 2.
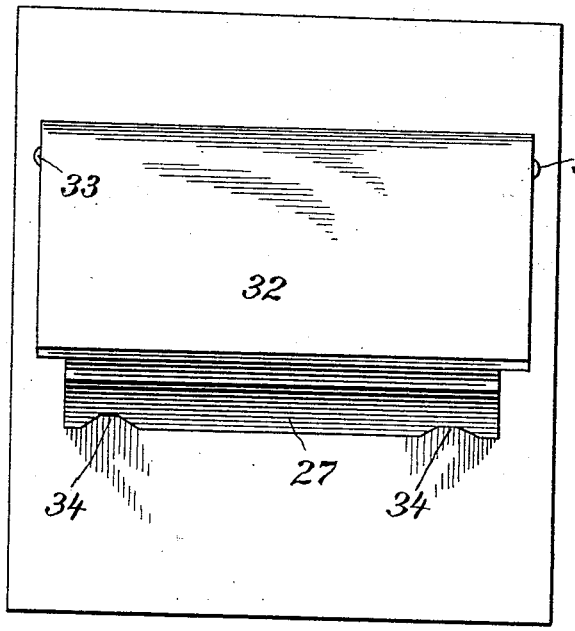
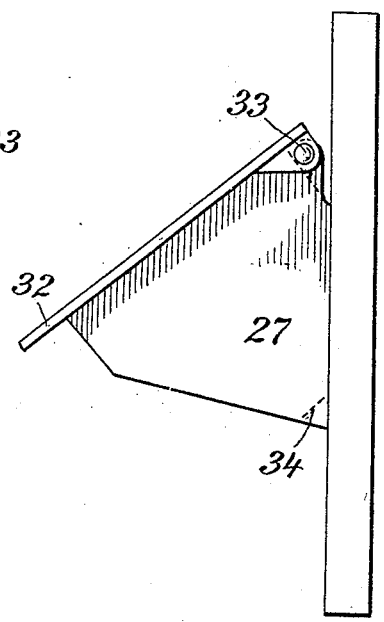
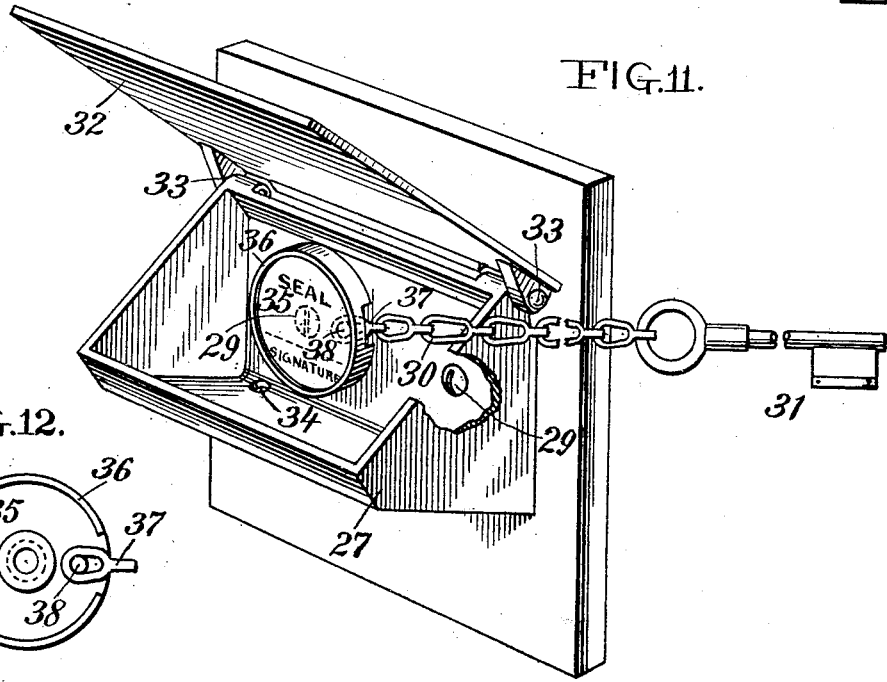
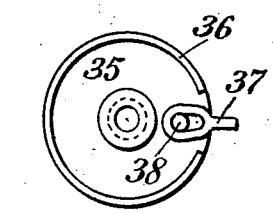

UNITED STATES PATENT OFFICE.

OTTO E. HAUSBURG, OF NEW YORK, N. Y.

WATCHMAN'S-CLOCK INSTALMENT.

No. 912,957.     Specification of Letters Patent.     Patented Feb. 16, 1909.

Application filed April 1, 1905. Serial No. 253,212.   Renewed September 18, 1908. Serial No. 453,669.

*To all whom it may concern:*

Be it known that I, OTTO E. HAUSBURG, a subject of the Emperor of Germany, and resident of New York, in the county of New York and State of New York, have invented certain new and useful Improvements in Watchman's-Clock Instalment, of which the following is a specification.

The invention herein described, has for its object, to provide means for preventing the keys formed with type thereon from being worn out and rusted prematurely. In practice, the keys are roughly handled, necessarily by the watchman, and therefore if the letters, numbers or other characters formed thereon are in bas relief, the letters or other characters are so small, being usually only about one-sixteenth of an inch wide and high, that, when the key is knocked against the iron box into which they are thrown, these characters are broken off and soon wear into imperfect figures at least. Again the box must be especially constructed to prevent entrance of rain, and must be of such a nature as to drain off any moisture that collects from mist and fog. By my invention, further, I provide that with one set of eleven characters on the clock printing plate about double the number of keys may be employed, thereby making it practical to use that much smaller clock and dial for the same number of keys.

In addition to the above named features and objects, I secure means which will prevent the watchman from carrying the keys with him to some one convenient location and thus be able to make up the record on the dial without taking the prescribed trip through the premises. Any attempt, even, to take a key away from the station at which it belongs will leave its telltale mark behind permanently.

The elements of the combination are represented in the accompanying figures of drawing.

Figure 1 is a plan of the whole device. The cover is open. The device is the clock itself with the rotating dial and adjuncts, but the key box and keys are omitted from this figure. Fig. 1ª shows both sides of a dial which is partly folded. Fig. 2 is an inverted view of the character plate by itself. Fig. 2ª, is a partial section at the character plate. Figs. 3, 4, 5, and 6, are views of different keys. Fig. 7 is a side view of the clock casing to show the key hole, not for the key to wind the clock, but for the entrance and guidance of the keys for making the record on the dial. Fig. 8 is a section at the line A B in Fig. 6, on a greatly enlarged scale to show the nature of the letters, figures or other characters on the key. Fig. 9, is a front elevation of the key box. Fig. 10 is an end elevation of the same box. Fig. 11, is a view of the same box, looking down obliquely, and with the cover open to show, especially the seal.

In all the figures of drawing, like reference numerals refer to like parts.

The first reference numeral employed is 20, because other numbers below that, are used for other purposes than reference characters.

20 represents the dial, driven continually by the clock movement, a portion of which is indicated at 21. Facing the dial 20, is a plate 22, having the numerals 1, 2, 3, 4, 5, 6, 7, 8, 9, 10, and a period, which latter is representative of any arbitrary character of any kind that is different from the preceding. These characters are raised embossed or bas relief, these terms meaning the same thing, for it is required that the letters stand out like type from the surface upon which they are formed. The lowest number is at the end of the plate 22 that is nearest the center of the dial while the period or dot is nearest the periphery of the dial. The plate 22 is fastened to the clock by screws 23. The dial is divided into radial sections and each section numbered to indicate minutes. Each section represents a quarter of an hour, as that is the time it will take for one section to pass the indicating point at 24. Another part of the watchman's clock instalment is the set of keys, only a few of which are shown, as by explaining a few all will be understood.

On the stem 25 of the key in Fig. 3, is an L shaped flange, and on the edge of the flange is a sunken or engraved numeral 1, not reversed, but located at the end of the key, and at a distance therefrom, is a dot or period, the locations of these two characters being such that when the key is pushed into the hole 26, as far as it will go, and turned, the dot will come opposite the dot on the plate 22, and the 1, will come opposite the 1 on the plate. By turning the key on the axis of the stem 25, the raised 1, on the plate will sink into the hollowed 1 on the key flange. Thus a raised 1, will appear on the under side of the dial, which being removed and turned over will show the raised 1, and accordingly, the dial is printed with sections and minutes on both sides, the 7 to indicate 7 o'clock being on both sides and directly opposite each other and so on with the other minute and hour indications. In a similar manner the next key in the drawing may be used. As the dial will have both the numeral and the dot printed on the dial, this combination is to indicate the number 11, and 12, respectively. When 1 alone is to be indicated, then the dot is omitted from the key.

The box consists of the combination of the under portion or box proper, at 27, mounted upon a base board or plate by the screw 29, whose head appears inside the box and which fastens also the end of the chain 30, to which the key 31 is attached at the other end of the chain. Over the head of the screw is a seal, which may be pasted on, and have a signature. The screw cannot therefore be removed without the fact being made known, and neither can the box itself be carried off without similar difficulties.

When one is through with the key, it is thrown into the box and the lid 32 shut down, it being hinged at 33. This lid overlaps the top edges of the box and slopes down, thereby keeping the box protected from rain. The bottom of the box slopes down too, to drain out any moisture that collects in the box, through drain holes 34.

The operation is as follows;—The box and keys being made of metal, the advantage of the sunken characters on the keys, instead of raised characters thereon, becomes apparent; for the keys when thrown into the box, strike any where but at the letters or characters, for they are entirely protected, being nothing more than a cut in the metal. A watchman after having made a record on his clock dial, and put the key into the box, and closed the lid, which is so hinged as to fall down shut anyway, by its own weight, goes to the next key and puts it into the hole 26, which, by virtue of its guiding surface guides the key inward, and then the watchman turns the key while in the maximum distance in the hole, and turns with considerable force, whereby the number on the plate corresponding to that on the key enters that on the key, and makes a record on the dial, the paper of the dial being pressed down and over the raised number on the character plate 22. The clock work 21 continues to move the dial, so that by the time the watchman reaches the next station, he makes another record on a different part of the dial with a different key, the characters on successive keys being differently located with respect to the ends of the keys, as in the case of the characters on the plate 22. 1, is nearest the outer end of the key that has that number, 2 is further from the corresponding end of the next key, 3 is at a greater distance from the corresponding end on the next key, and so on indefinitely. At certain long intervals, as for example every morning, the superintendent examines the record, which should indicate an impressed number on the dial at every quarter of an hour or at other intervals, according to the instructions given to the watchman.

The remaining details are as follows;—35 is a cap, with a projecting rim 36 on the outside, within which closely fits the seal, so marked, for the purpose of preventing the seal from being easily peeled off, or so that the rain and dampness cannot get on the under side of the seal and dissolve the retaining glue. The under side of the cap 35, has a notch in its border for the passage of the link 37 of the chain, and it has also, a pin 38, which passes through said chain link 37, for holding it at a point within the cap, where the pin is inapproachable, except by removing the screw 29.

I claim as my invention:—

1. In a watchman's clock instalment, the combination of a dial having hours and minutes indicated at the periphery on each side of said dial, a clock movement for rotating said dial at the speed of the hour hand of the clock, a plate facing the dial and reaching from the periphery to the central portion of the dial radially, and having embossed characters thereon, a casing supporting said dial and said plate, and having a key hole in the side thereof which key hole has surfaces for guiding a key from the outside of the casing to the inside to be pressed against the side of said dial for pressing said dial against said plate, the key having a sunken character thereon, a box for containing said key, a seal connecting said key to said box on the inside thereof, a chain connecting said key to said seal, for permitting the key to be removed from the box to said key hole, a rain proof cover for said box, having edges overlapping the top edges of said box, which has drain holes for any collected moisture from the air.

2. In a watchman's clock instalment, the combination of a rotating dial, characters for marking thereon, a plate supporting said characters, a key having sunken characters, fac-simile of those first mentioned for combining by pressure to form characters on said dial, a box for said key, a chain connected to said key, a cap, a pin within and projecting from said cap, and passing through one of the loops of said chain, a screw passing through said cap for fastening the same to said box, said cap having a projecting rim, and a seal fitting within said rim, closely, and pasted to said cap over the head of said screw, said pin being on the opposite side of the cap from said seal and extending far enough toward the wall of said box to prevent the said loop from escaping from said pin.

3. In a watchman's clock instalment, the combination of a dial, a key having a sunken character for marking on said dial, a box for the key, a cap, a pin on the cap, a chain, through one of whose links said pin extends, means for fastening said cap to said box, and a seal for preventing said cap from being removed from said box without breaking the seal, and for preventing said link from escaping from said pin without breaking the seal.

4. In a watchman's clock instalment, the combination of a dial, a key having a sunken character for marking on said dial, a disk, projecting rims on both sides of said disk, one of the rims having a notch therein, a pin projecting from said disk at the same side as the rim having the said notch, a chain, through one of whose links said pin passes, a screw fastening the disk to a wall, with the pin extending closely enough to said wall to prevent the escape of said link from said pin, and a seal pasted over said disk and covering the head of said screw, and closely fitting within that other rim which does not have said notch.

5. In a watchman's clock instalment, the combination of a rotating dial, a key having a sunken character thereon, for marking on said dial, a box, a base board for the box, a chain fastened to said key, a clamping device holding both the end of the chain and the box to said base board, a projecting rim on the device, and a seal affixed over the clamp and surrounded closely by said rim, to prevent the removal of the box and key without injuring the seal.

6. In a watchman's clock instalment, the combination of a dial, a key having a sunken character for marking on said dial, a disk, a pin, a link of a chain over the pin, a screw for holding the disk to a support in such a manner as to prevent the removal of said link from said pin, and a seal pasted over the screw head, in such a manner as to prevent the removal of said disk without injuring the seal.

In witness whereof, I have hereunto signed my name this 31st day of March, 1905.

OTTO E. HAUSBURG.

Witnesses:
L. E. HICKS,
W. A. KELLY.